(12) United States Patent
Behar et al.

(10) Patent No.: US 7,996,112 B1
(45) Date of Patent: Aug. 9, 2011

(54) ROBOT AND ROBOT SYSTEM

(75) Inventors: Alberto E. Behar, Hermosa Beach, CA (US); Neville I. Marzwell, Claremont, CA (US); Jonathan N. Wall, Pasadena, CA (US); Michael D. Poole, Los Angeles, CA (US)

(73) Assignee: United States of America as represented by the Administrator of The National Aeronautics and Space Administration, Washington, DC (US)

( * ) Notice: Subject to any disclaimer, the term of this patent is extended or adjusted under 35 U.S.C. 154(b) by 1103 days.

(21) Appl. No.: 11/756,793

(22) Filed: Jun. 1, 2007

(51) Int. Cl.
*G05B 11/00* (2006.01)

(52) U.S. Cl. ........................................ 700/258; 414/680

(58) Field of Classification Search .................. 700/258, 700/254, 245, 257, 262, 248, 249; 414/680, 414/744.5; 901/15, 21, 28, 31, 46, 47; 318/568.12, 318/568.2, 568.21–568.25, 574
See application file for complete search history.

(56) References Cited

U.S. PATENT DOCUMENTS

| | | |
|---|---|---|
| 4,511,011 A | 4/1985 | Bartholet |
| 4,527,650 A | 7/1985 | Bartholet |
| 4,738,583 A | 4/1988 | Macconochie et al. |
| 5,136,201 A | 8/1992 | Culp |
| 6,438,456 B1 | 8/2002 | Feddema et al. |
| 6,462,498 B1 | 10/2002 | Filo |
| 6,535,793 B2 | 3/2003 | Allard |
| 6,567,724 B2 | 5/2003 | Yamamoto |
| 6,636,781 B1 * | 10/2003 | Shen et al. ..................... 700/248 |
| 6,675,068 B1 | 1/2004 | Kawasaki |
| 6,845,297 B2 | 1/2005 | Allard |
| 6,866,557 B2 * | 3/2005 | Randall ......................... 446/356 |
| 7,541,764 B2 * | 6/2009 | Takenaka et al. ........ 318/568.12 |
| 7,734,375 B2 * | 6/2010 | Buehler et al. ................ 700/245 |
| 2004/0220707 A1 | 11/2004 | Pallister |
| 2005/0275367 A1 | 12/2005 | Buehler et al. |

* cited by examiner

*Primary Examiner* — Dalena Tran
(74) *Attorney, Agent, or Firm* — Mark Homer

(57) ABSTRACT

A robot and robot system that are capable of functioning in a zero-gravity environment are provided. The robot can include a body having a longitudinal axis and having a control unit and a power source. The robot can include a first leg pair including a first leg and a second leg. Each leg of the first leg pair can be pivotally attached to the body and constrained to pivot in a first leg pair plane that is substantially perpendicular to the longitudinal axis of the body.

20 Claims, 16 Drawing Sheets

ROBOT AND ROBOT SYSTEM

STATEMENT AS TO FEDERALLY-SPONSORED RESEARCH

The invention described herein was made in the performance of work under a NASA contract, and is subject to the provisions of Public Law 96-517 (U.S.C. 202), in which the Contractor has not elected to retain title.

FIELD OF THE INVENTION

The present teachings relate to a robot that is capable of efficiently moving in zero-gravity conditions. In particular, the present teachings relate to a robot that can operate in an extra-terrestrial environment and can be controlled from a host computer located at a remote location.

BACKGROUND OF THE INVENTION

Many presently known robots include complex linkages having many joints, motors, and encoders. The complexity of these known robots makes them bulky, heavy, slow, expensive, and unreliable.

A few critical factors that are considered when designing a robot are compactness, complexity, cost, maneuverability, reliability, and speed.

Accordingly, there continues to exist a need for a robot that is compact, lightweight, inexpensive to manufacture, and capable of efficiently performing various requested tasks. There also exists a need for a robot that is capable of performing tasks in a zero-gravity environment that are communicated to the robot from a remote host computer.

SUMMARY OF THE INVENTION

The present teachings disclose such a robot that is capable of functioning in a zero-gravity environment, as well as a robot system.

According to the present teachings, the robot includes a body having a longitudinal axis and including a power source and a control unit. The robot also includes a first leg pair including a first leg and a second leg. Each leg of the first leg pair is pivotally attached to the body and is constrained to pivot in a first leg pair plane that is substantially perpendicular to the longitudinal axis of the body.

The present teachings also describe a robot having a body including a power source and a control unit. The robot also includes at least one leg pivotally attached to the body. The leg includes a first pivot joint that includes a first servo motor, a first controller module, and a first spring-loaded compliance mechanism. The control unit is arranged to communicate with the first controller module to control pivotal movement of the leg.

The present teachings further describe a robot system including a body having a communication system capable of receiving high level commands from a host computer, a control unit, and a power source. The robot system also includes at least one leg pivotably attached to the body. Each leg includes a first pivot joint including a first controller module and a first servo motor, a second pivot joint including a second controller module and a second servo motor, and a foot assembly. Further, each of the first and second controller modules is capable of directly communicating with the control unit.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a robot having a plurality of leg pairs and capable of functioning in a zero-gravity environment. According to the present teachings, the robot can receive commands from a remotely located host computer and can direct commands to the plurality of leg pairs to achieve movement of the robot.

Figure 1:
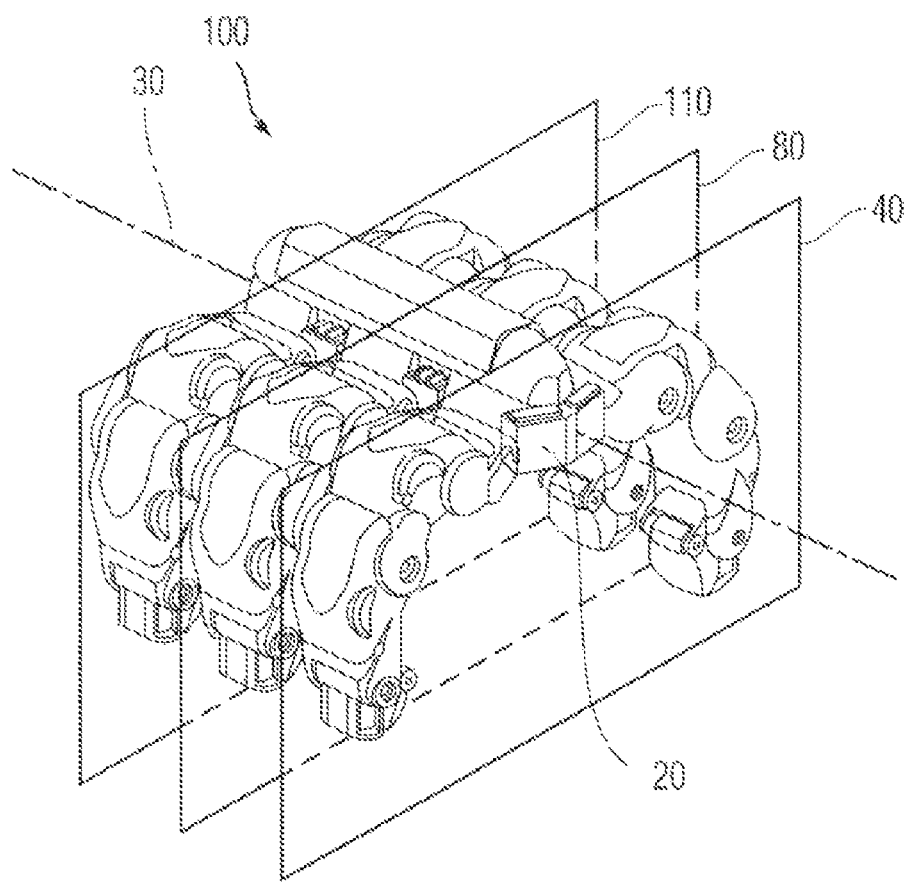
FIG. 1 is a perspective view of an embodiment of the robot of the present teachings.

Referring to FIG. 1, an embodiment of the robot 100 of the present teachings is shown. The robot 100 can include a body 20 having a longitudinal axis 30 and three leg pairs attached to the body 20. Each of the leg pairs can be arranged to articulate or pivot in a corresponding leg pair plane, such as in leg pair planes 40, 80, 110. Each of the leg pair planes 40, 80, 110 can be substantially perpendicular to the longitudinal axis 30 of the body 20.

Figure 2:
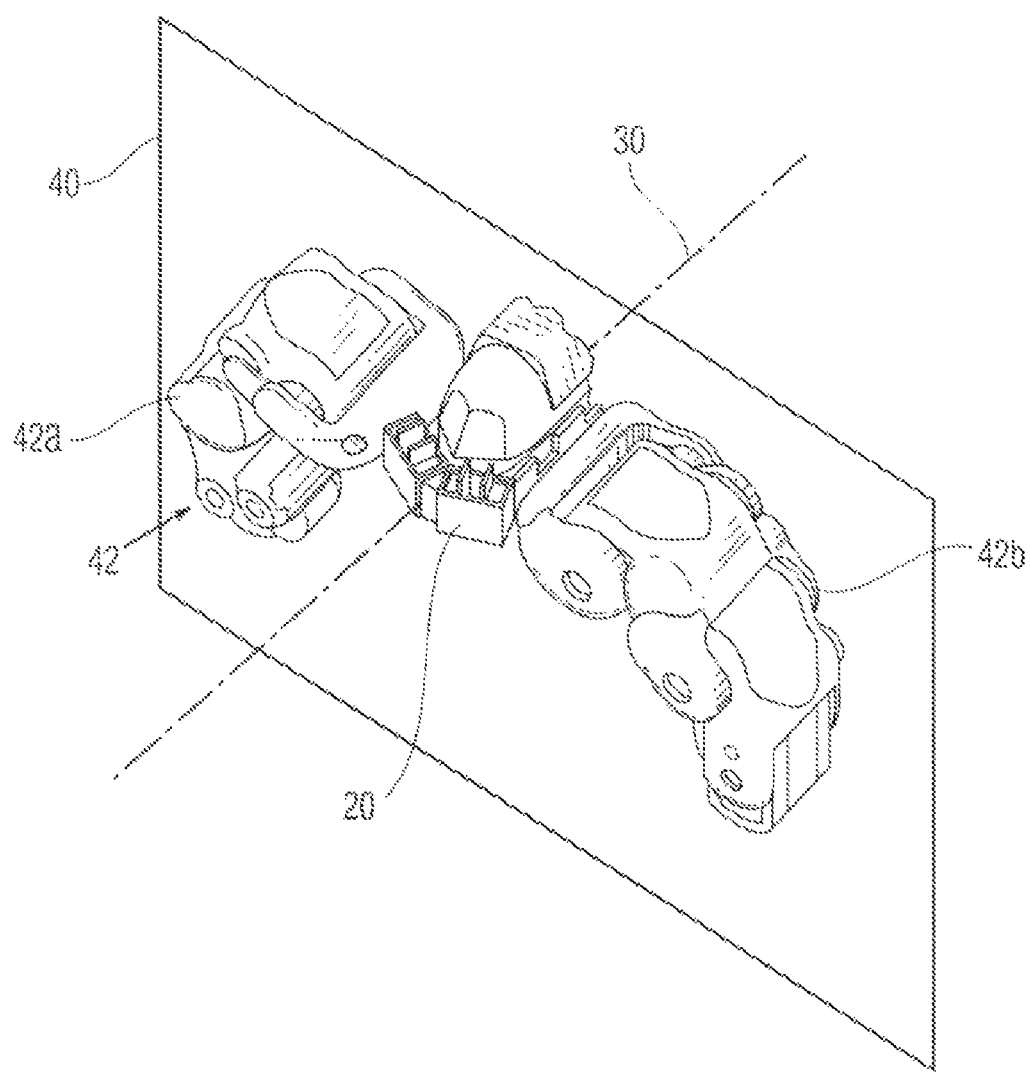
FIG. 2 is a perspective cut-away view of the robot showing a first leg pair according to various embodiments.

Referring to FIG. 2, a first leg pair 42 of the robot 100 of the present teachings is shown. The first leg pair 42 includes first legs 42a, 42b. One end of each of the first legs 42a, 42b can be attached to a portion of the body 20. Furthermore, each of the first legs 42a, 42b can be arranged to articulate or pivot in a clockwise or a counter-clockwise direction with respect to the longitudinal axis 30 of the body 20 within the first leg pair plane 40.

Figure 3:
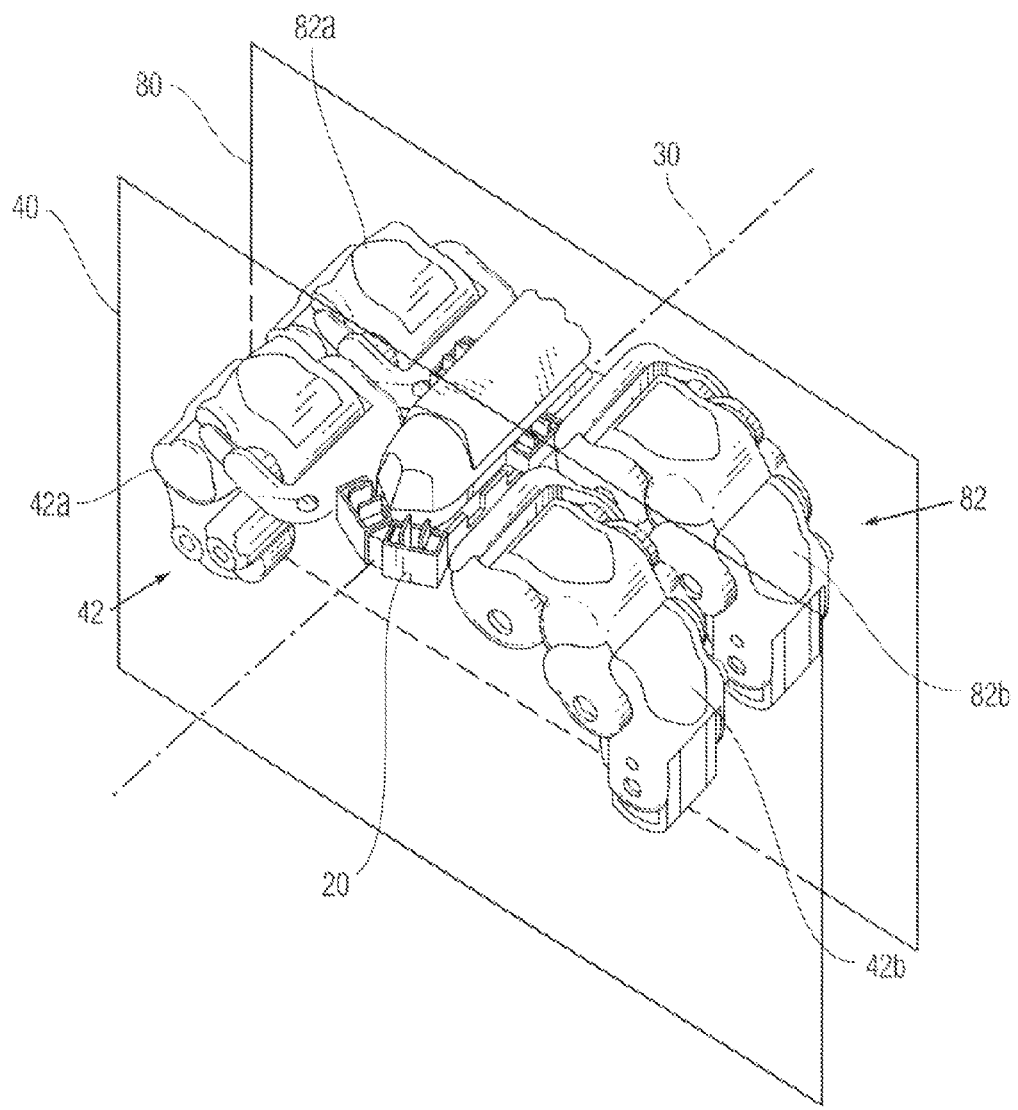
FIG. 3 is a perspective cut-away view of the robot showing a first and second leg pair according to various embodiments.

Referring to FIG. 3, the robot 100 of the present teachings is shown having two leg pairs 42, 82. The additional second leg pair 82 includes second legs 82a, 82b. One end of each of the second legs 82a, 82b can be attached to a portion of body 20. Furthermore, each of the second legs 82a, 82b can be arranged to articulate or pivot in a clockwise or a counter-clockwise direction with respect to the longitudinal axis 30 of the body 20 in the second leg pair plane 80. The second leg pair plane 80 can be substantially parallel to the first leg pair plane 40.

Figure 4:
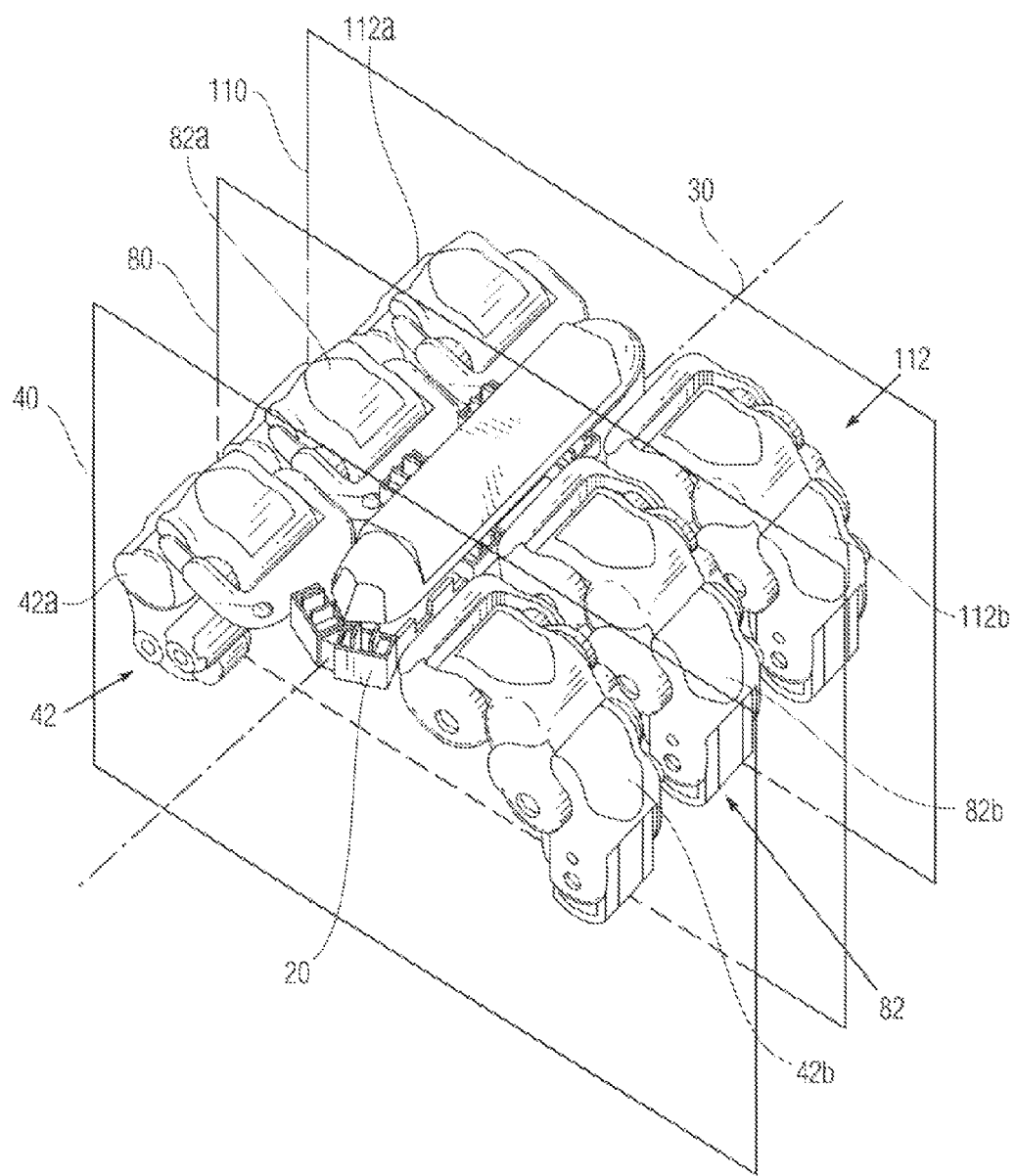
FIG. 4 is a perspective view of the robot showing a first, second, and third leg pair according to various embodiments.

Referring to FIG. 4, the robot 100 of the present teachings is shown having three leg pairs 42, 82, 112. The additional third leg pair 112 includes third legs 112a, 112b. Each of the legs 112a, 112b can be attached to the body 20. Furthermore, each of the third legs 112a, 112b can be arranged to articulate or pivot in a clockwise or a counter-clockwise direction with respect to the longitudinal axis 30 of the body 20 in the third leg pair plane 110. Moreover, the third leg pair plane 110 can be substantially parallel to the first and second leg pair planes 40, 80. According to various embodiments, one or more of the leg pairs 42, 82, 112 can be arranged to not be completely perpendicular to the longitudinal axis 30 of the body 20. For example, the arrangement of the first leg pair 42 and the second leg pair 112 can slightly deviate from being perpendicular with respect to the longitudinal axis 30 to provide an inherently self-centering tendency to the robot 100 as it moves.

During operation, coordinated movement of the three leg pairs 42, 82, and 112 in the first, second, and third leg pair planes 40, 80, and 110, respectively, results in the robot 100 moving in a direction perpendicular to the longitudinal axis 30 of the body 20. That is, the robot 100 can move in a direction transverse to the longitudinal axis of its body 20, much like the walking characteristics of a crab, which moves in a sideways manner.

Although the robot 100 of the present teachings is described as having three leg pairs 42, 82, and 112, the robot 100 can be arranged to incorporate any number of legs and leg pairs. For example, the robot 100 can have as few as one leg to as many as five or more leg pairs. According to various embodiments, one or more of the leg pairs can be arranged to articulate or pivot beyond the confines of the planes that are substantially perpendicular to the longitudinal axis 30 of the body 20 of the robot 100.

Figure 5:
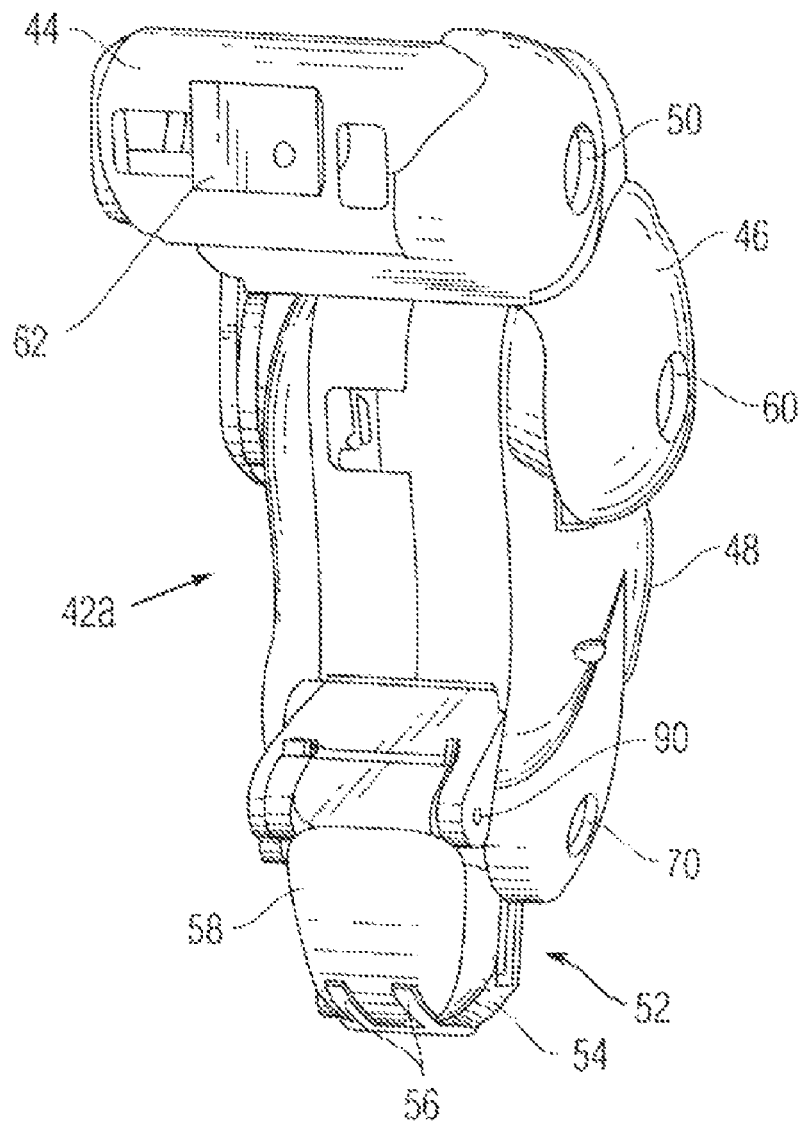
FIG. 5 is a perspective view of a back-side of a first leg of the first leg pair according to various embodiments.

Referring to FIG. 5, one exemplary leg of the robot 100 is shown. For illustrative purposes, the leg shown in FIG. 5 corresponds to leg 42a of the first leg pair 42 but could describe the structure of any of the legs of the robot 100. The leg 42a can include a shoulder 44 that can be connectable to the body 20. The leg 42a can also include a bicep 46. A first pivot joint 50 can pivotally connect the shoulder 44 to the bicep 46. Furthermore, the leg 42a can include a forearm 48. A second pivot joint 60 can pivotally connect the forearm 48 to the bicep 46.

In addition, the leg 42a can include a foot assembly 52, such as a gripper assembly as shown in FIG. 5. Preferably, the gripper assembly 52 can include a first gripper 54 and a second gripper 58. Either or both of the first gripper 54 and the second gripper 58 can include gripper teeth 56. A first gripper pivot joint 70 can pivotally connect the first gripper 54 to the forearm 48. Furthermore, a second gripper pivot joint 90 can pivotally connect the second gripper 58 to the underside of the forearm 48. Together, the first gripper pivot joint 70 and the second gripper pivot joint 90 allow the grippers 54, 58 to open and close to allow the gripper assembly 52 to grip and hold various different objects. The grippers 54, 58 can be provided in different shapes depending upon the desired types of gripping and/or motions to be performed by the robot 100.

The pivot joints 50, 60, 70, 90 of the leg 42a can provide it with at least three degrees of freedom: (i) the first pivot joint 50 can allow the leg 42a to rotate above or below the body 20 in the first leg pair plane 40, (ii) the second pivot joint 60 can allow the leg 42a to achieve a curl motion in the first leg pair plane 40, and (iii) the gripper joints 70, 90 can allow the grippers 54, 58 of the gripper assembly 52 to open or close. According to various embodiments, the leg 42a can be provided with additional pivot joints, for example, a pivot joint can be provided above the first pivot joint 50, on or in the vicinity of the shoulder 44, to allow the leg 42a to rotate and articulate beyond the first leg pair plane 40. In such an alternative embodiment, the additional pivot joint would allow one or more of the legs to turn the robot 100 in order to re-direct the movement direction.

Figure 6:
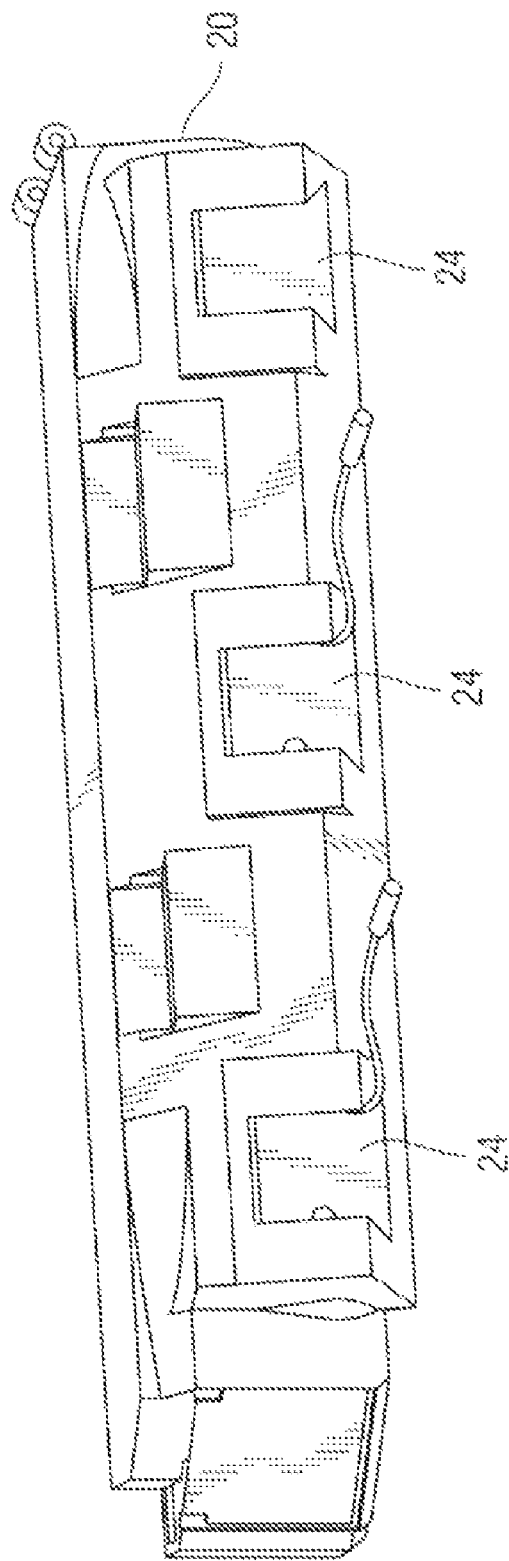
FIG. 6 is a perspective side view of the body of the robot according to various embodiments.

The robot 100 can also be designed so that one or more of the legs is modular. For example, the shoulder 44 of a leg 42a can be provided with a body mount bracket 62 that would allow the leg 42a to detachably connect with one or more connectors 24 arranged on the body 20, see FIGS. 6 and 9. Each of the body mount bracket 62 and the corresponding connectors 24 can include complimentary-arranged electrical connectors that provide electrical communication between the leg 42a and the body 20. The modular architecture of the legs can simplify debugging and reduce part complexity of the robot 100.

The housings of the robot body 20 and each of the legs securely support and house various electrical and mechanical components of the robot 100. Preferably, the body 20 and each of the legs can be fabricated using a process that minimizes the mass of the robot 100 and provides these housings with sufficient strength and durability to withstand extreme conditions, such as weightlessness, vibrations, heat, cold, and the like. For example, the total mass of the robot 100 can be designed to be less than about 5 lbs., and preferably can be about 1.5 lbs. Additionally, the overall dimensions of the robot 100 can be about 36 cm× about 50 cm× about 32 cm or less. Preferably, the robot 100 includes three leg pairs 42, 82, 112, has overall dimensions of about 18 cm× about 25 cm× about 16 cm, and a mass of about 1.5 lbs.

To fabricate the robot 100 with the preferred overall dimensions of about 18 cm× about 25 cm× about 16 cm and a mass of about 1.5 lbs., a solid freeform fabrication process can be implemented. The solid freeform fabrication process can include a selective laser sintering (SLS) process and/or a stereolithography (SLA) process. The chassis of the robot 100, that is, the housings for the body 20 and each of the legs, can be fabricated using both of the SLS process and the SLA process. The SLS process can be used to produce all parts of the robot 100 with the exception of the gripper assembly 52, as this process results in much lighter and durable parts as compared to the SLA process. However, the SLA process results in the formation of more precise parts. Accordingly, the gripper assembly 52, including an integrated gearing mechanism, can preferably be fabricated by the SLA process to achieve a smooth interconnectivity between parts, such as between the gears, while achieving relatively low brittleness.

Figure 7:
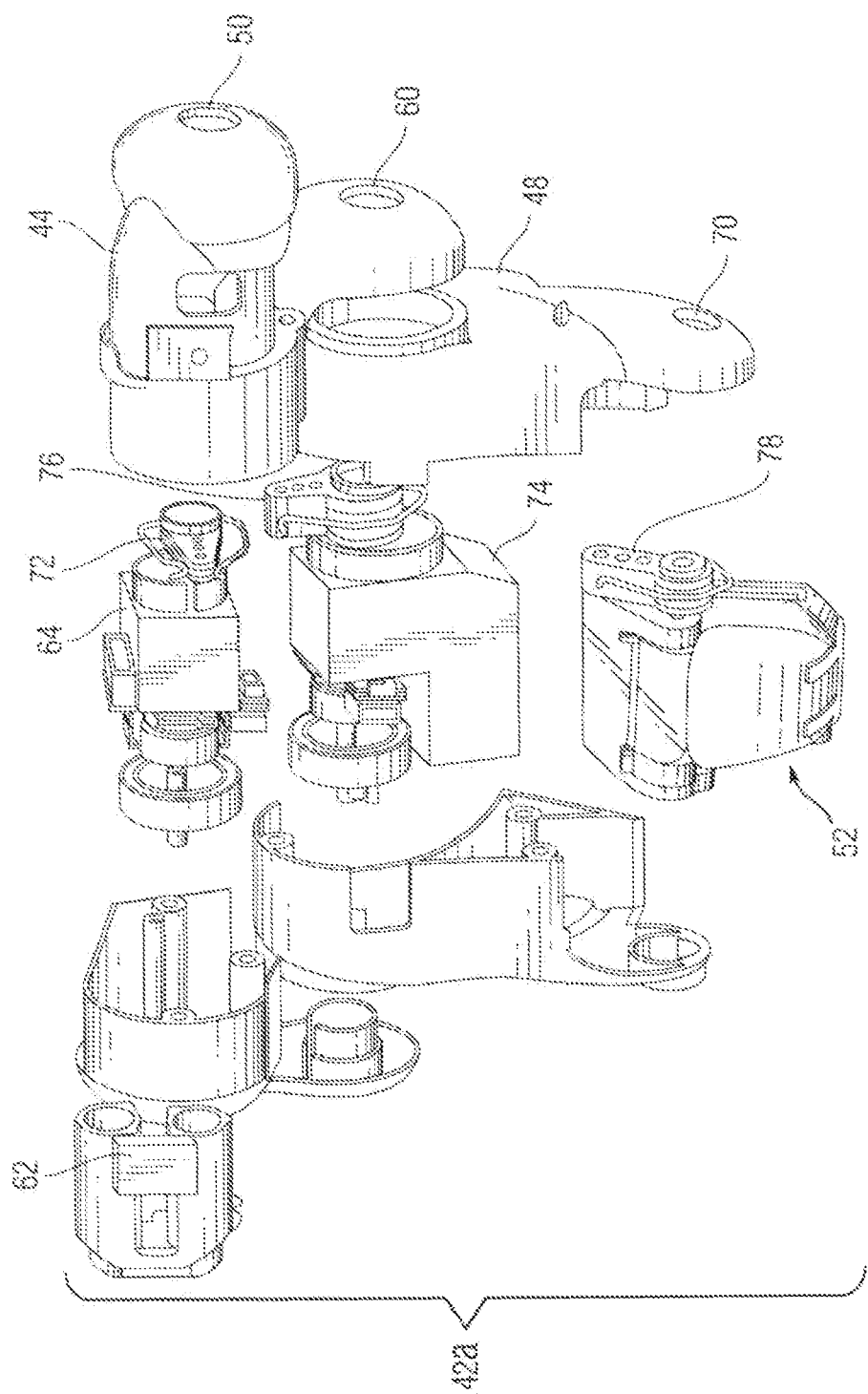
FIG. 7 is an exploded view of the leg of FIG. 5.

Referring to FIG. 7, various components that are held within the housings of an exemplary leg 42a of the robot 100 are shown. According to FIG. 7, the first pivot joint 50 can include a first servo motor 64 and the second pivot joint 60 can include a second servo motor 74. Each of the first servo motor 64 and the second servo motor 74 can include a servo controller module, or SCM. Each SCM can include a motor controller (e.g., an H-Bridge DC motor controller) and a processor (e.g., an ATMEL MEGA88 processor commercially available from Atmel Corporation of San Jose, Calif.) for controlling a servo motor. Furthermore, each SCM can be separately programmed with a unique address so that commands can be addressed and sent specifically to that SCM from a control unit 116 of the robot 100. The SCM of the second servo motor 74 of the second pivot joint 60 can also be arranged to control the gripper assembly 52. Although not shown in the figures, a non-modified servo motor (e.g., a non-modified CIRRUS micro-servo commercially available from Global Hobby Distributors of Fountain Valley, Calif.) can be positioned in the first gripper pivot joint 62. The non-modified servo motor can be arranged to power the gripper assembly 52 and can be controlled by the SCM of the second servo motor 74.

In addition to servo motors 64, 74, each of the first pivot joint 50, the second pivot joint 60, and the first gripper pivot joint 70 can include a spring compliance mechanism 72, 76, and 78, respectively. The spring compliance mechanisms 72, 76, and 78 can allow each pivoting component (i.e. bicep 46, forearm 48, first gripper 54) of the leg 42a to deflect past desired positions in either pivoting direction without the respective servo motor being turned. As will be further discussed below, the spring compliance mechanisms 72, 76, 78 can function to provide a level of fault tolerance, protect each of the servo motors, and allow the operator to determine torques that have been applied to the components of the leg 42a.

Figure 8:
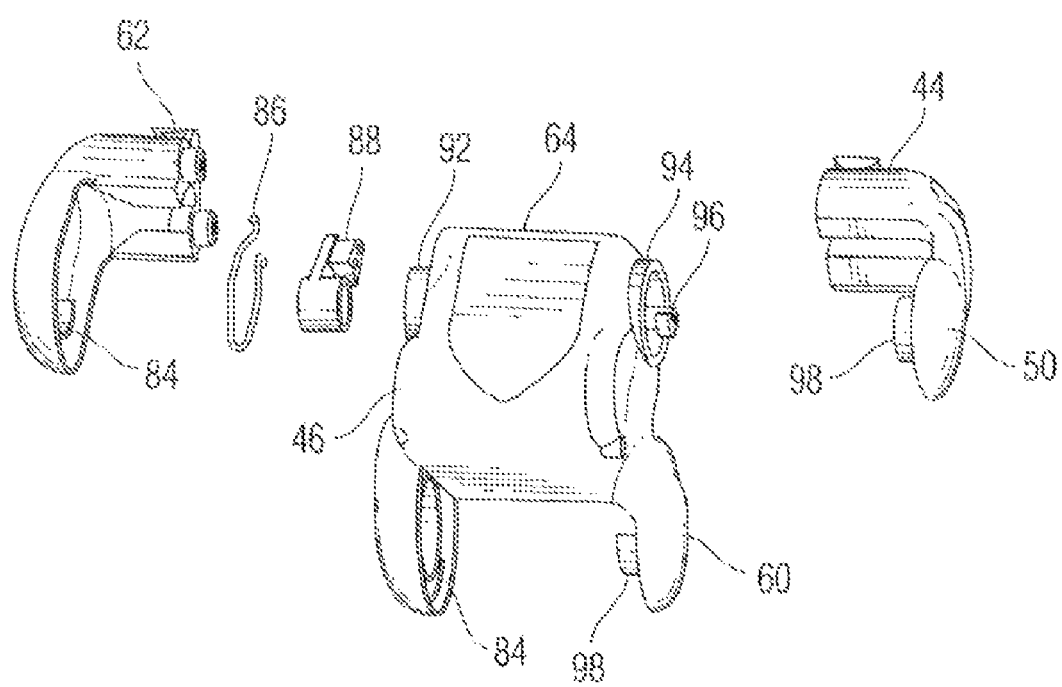
FIG. 8 is an exploded view of a portion of the front side of the leg of FIG. 5.

Referring to FIG. 8, subcomponents of the first pivot joint 50, which pivotally connects a shoulder 44 to a bicep 46, will be described. While FIG. 8 shows the subcomponents of the first pivot joint 50 and portions of the second pivot joint 60, the same or substantially similar sub-components can be arranged in the second pivot joint 60 which connects the bicep 46 to the forearm 40 (not shown in FIG. 8), or in any other of the leg pivot joints. The first pivot joint 50 can include a spring mount socket 84 positioned within a first side portion of the shoulder 44 and a potentiometer mount socket 98 positioned inside a second side portion of the shoulder 44. Additionally, the shoulder 44 can house additional sub-components of the first pivot joint 50 including a spring 86, rocker arm 88, front bearing 92, the servo motor 64 (situated within the housing of the bicep 46), potentiometer arm 96, and a rear bearing 94.

In an assembled state of the shoulder 44, the spring 86 can sit securely about the spring mount socket 84. Preferably, the spring mount socket 84 can include a groove that can accommodate the spring 86 and non-rotatably secure it in place, as will be described in more detail below with reference to FIG. 9. Similarly, and still referring to FIG. 8, the second pivot joint 60 formed on the bicep 46 can also include a spring mount socket 84 having a groove securing another spring.

Figure 9:
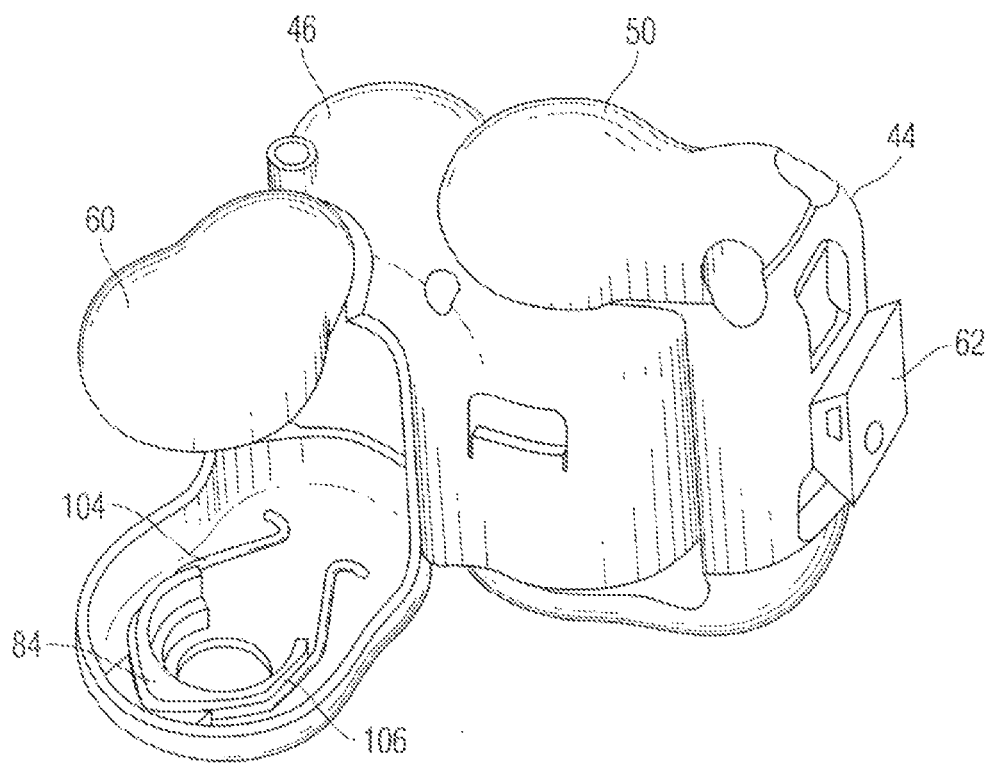
FIG. 9 is a perspective view of the portion of the leg of FIG. 8 showing a spring mount socket according to various embodiments.

Now referring to FIG. 9, an enlarged view of the structure for securing a spring of a pivot joint to its corresponding spring mount socket 84 is shown. In particular, FIG. 9 shows a closed end of a second spring 104 fitted into a groove 106 of the spring mount socket 84 of the second pivot joint 60 of the bicep 46. At the open end of the second spring 104, the two spring ends extend outwardly and away from the spring mount socket 84. Each of these spring ends can resiliently engage a groove formed in the rocker arm 88 in an assembled condition of the pivot joint, as will be discussed in more detail below.

Figure 10:
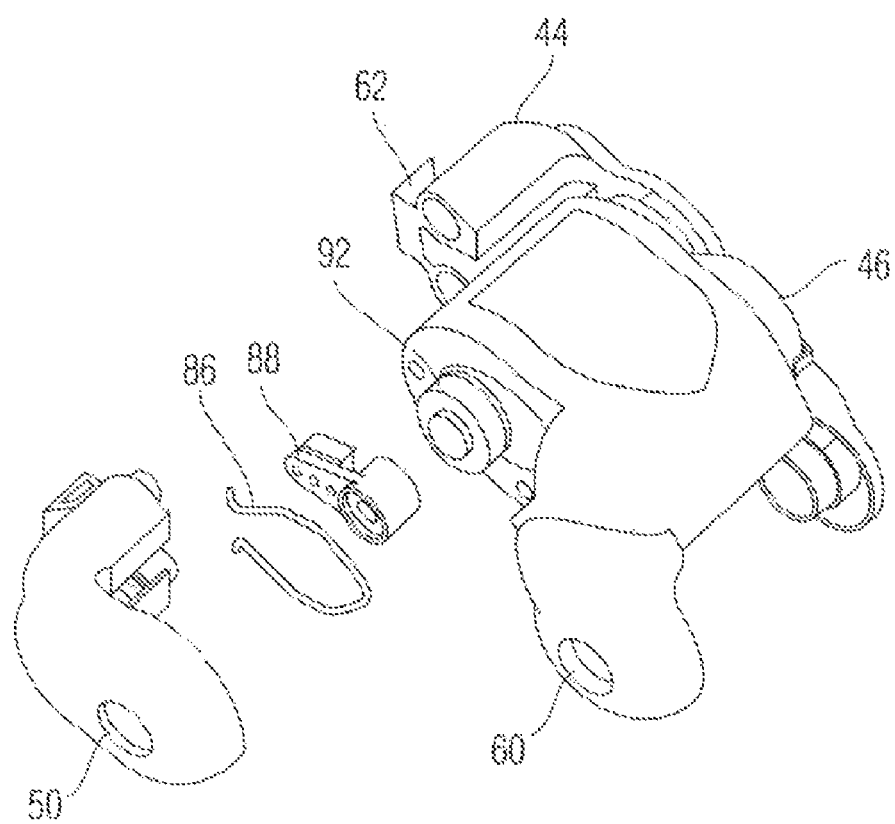
FIG. 10 is an exploded, perspective view of the portion of the leg of FIG. 8 showing a rocker arm according to various embodiments.

Referring now to FIG. 10, the rocker arm 88 of the first pivot joint 50 is shown in an exploded view of the pivot joint 50. The rocker arm 88 is shown separated by a distance from an output shaft of the servo motor 64 which is housed within the bicep 46. The rocker arm 88 can essentially form a radially extending paddle having grooves into which the ends of the spring 86 can extend while a closed end of the spring 86 is arranged about the spring mount socket 84 in the assembled condition of the first pivot joint 50. In an assembled state of the shoulder 44, the front bearing 92 of the first pivot joint 50 can sit within the spring mount socket 84 of the shoulder 44, as described above in relation to FIGS. 8 and 9. The front bearing 92 can support the rocker arm 88 and any loads applied to the leg. Whenever a torque is applied to a particular leg or a portion thereof, the rocker arm 88 is rotated which in turn pushes against one of the ends of the spring 86 resulting in a counteracting torque being exerted by the spring 86 against the rocker arm 88 in the opposite direction.

Torques that are applied to a particular leg section can be measured by the potentiometer arm 96, shown in FIG. 8, and/or by one or more internal potentiometers (not shown) that can be incorporated into one or more of the servo motors 64, 74. Moreover, the internal potentiometer can provide information to a control unit 116 of the robot 100 corresponding to conditions of the servo motors 64, 74 and the position of the rocker arm 88.

Figure 11:
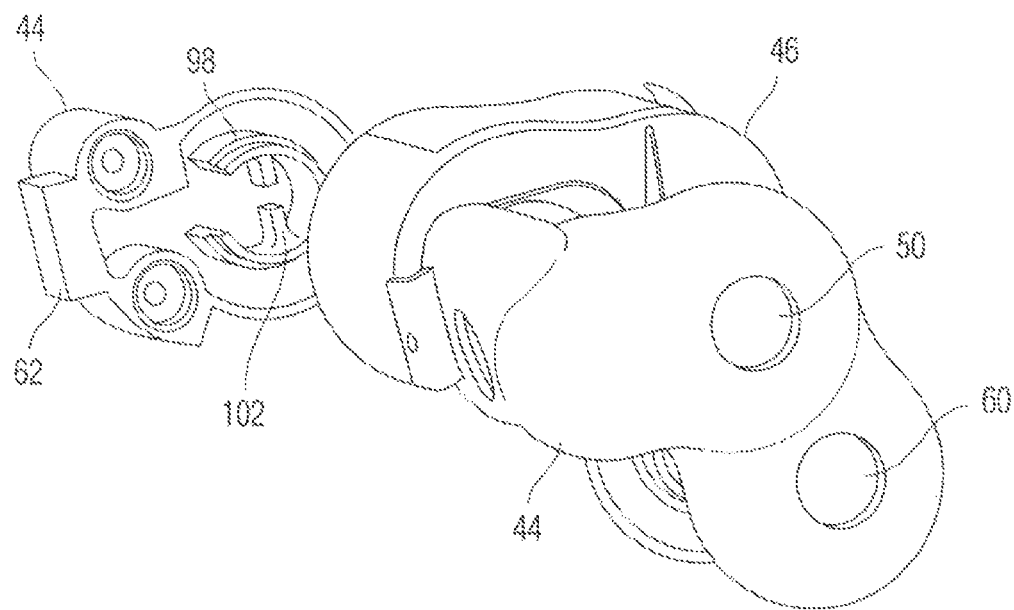
FIG. 11 is an exploded, perspective view of the portion of the leg of FIG. 8 showing a keyed slot according to various embodiments.
Figure 12:
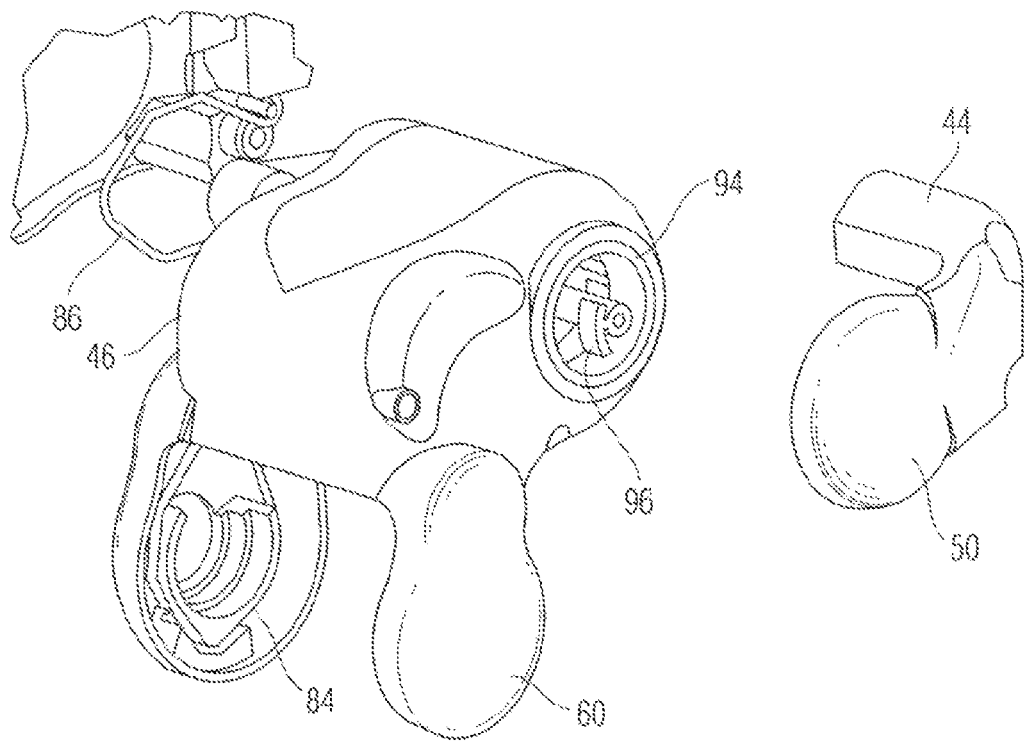
FIG. 12 is an exploded, perspective view of the portion of the leg of FIG. 8 showing a potentiometer arm and support bearing according to various embodiments.

Referring to both FIGS. 11 and 12, which show additional exploded views of the first pivot joint 50 that connects the shoulder 44 to the bicep 46, the potentiometer arm 96 can be arranged to fit into a keyed slot 102 on the potentiometer mount socket 98 formed on the shoulder 44. The potentiometer arm 96 can provide information to the control unit 116 corresponding to the actual positions of the leg. This information can be provided by the potentiometer arm 96 even when the joints of the legs are deflected beyond their desired positions as allowed by the spring-loaded compliance mechanisms 72, 76, 78. By measuring a difference or change between the internal potentiometer of a servo motor and the potentiometer arm 96, the operator can be provided with information about the torque applied to each of the legs. This information can be analyzed and used by the operator to program further robot movements.

Figure 13:
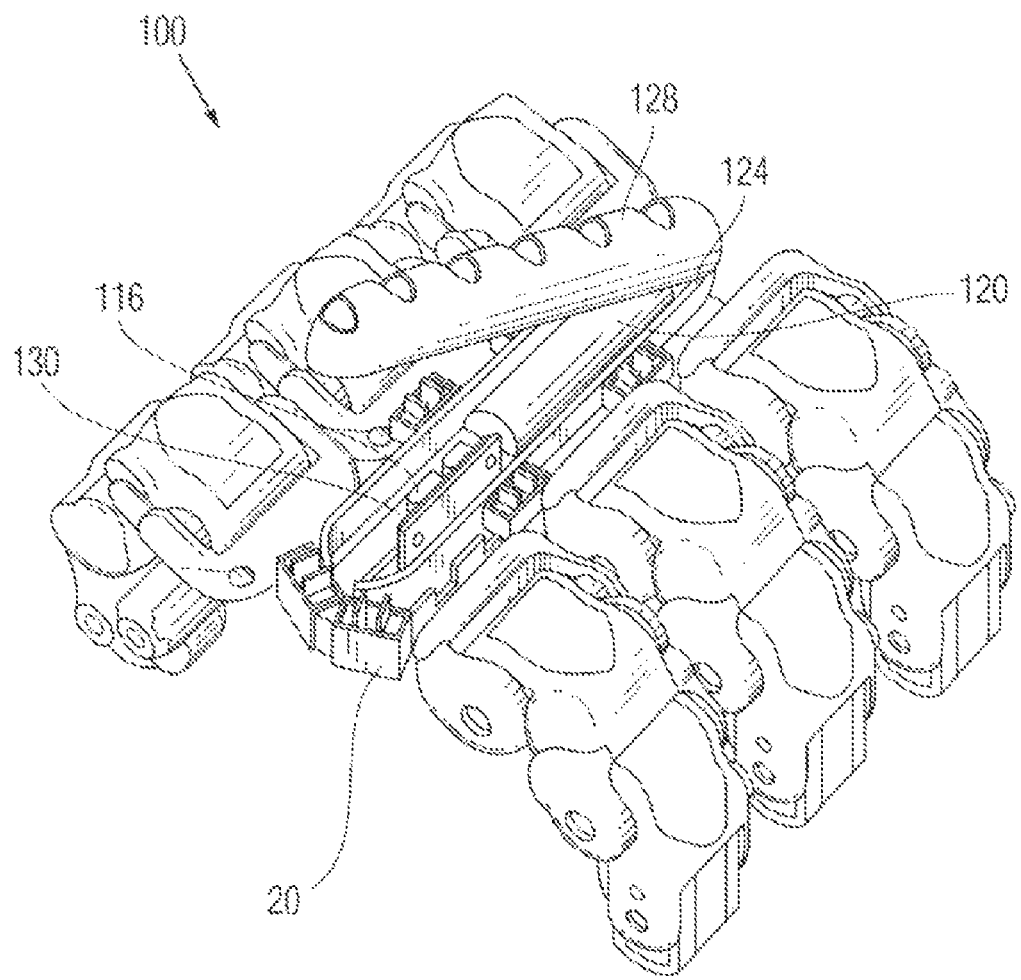
FIG. 13 is a perspective view of the robot showing an interior of the body according to various embodiments.

Referring to FIG. 13, a robot 100 is shown with internal components housed within its body 20 exposed. One or more body covers 128 can be provided to shield the internal components while allowing access thereto. The body 20 can house various components including a control unit 116, a power source 120, and a communication system 130. The power source 120 can be positioned within a power source compartment 124 of the body 20.

The power source 120 of the robot 100 can be any power source that is capable of providing sufficient power so that the robot 100 can continuously function for at least about 30 minutes. For example, the power source 120 can be a lithium ion cell. The lithium ion cell can be rated for approximately 2000 mAH at a supply voltage of 3.7 V. Other types of cells having different ratings and voltage supplies can be implemented as would be appreciated by one or ordinary skill in the art.

The control unit 116 arranged in the body 20 can be powered by the power source 120. The control unit 116 can send commands to each of the SCMs located in the first pivot joints 50 and in the second pivot joints 60 of each of the legs. These commands can be communicated to the SCMs of the legs by a hard wired interface 180 (see FIG. 15) that can link the control unit 116 with each of the SCMs. An exemplary wire interface 180 is ATMEL's two-wire interface (TWI) (commercially available from Atmel Corporation of San Jose, Calif.). Additionally, the control unit 116 can include a Universal Synchronous/Asynchronous Receiver/Transmitter (UART) interface that is capable of accommodating the communication system 130. The communication system 130 allows the control unit 116 to receive commands from a remotely located host computer 190 and to send data, such as, for example, status reports to the host computer 190. Any communication system 130 that would enable the control unit 116 to receive and send information from a remote host computer can be implemented in the robot 100 of the present teachings, such as, for example, a radio modem or BLUETOOTH communication device. Such a BLUETOOTH communication device can be arranged to communicate at band rates as high as about 115200 bps.

Figure 14:
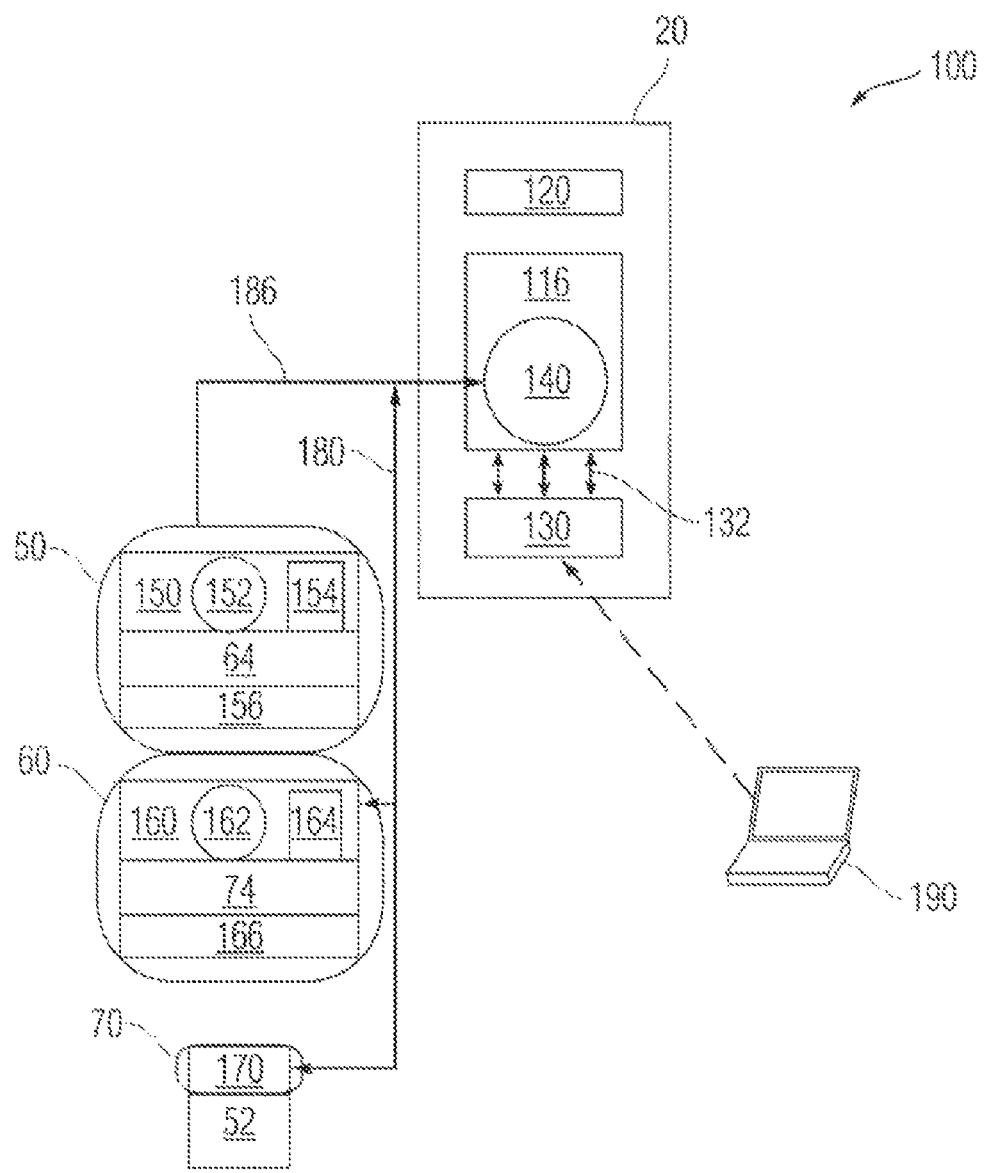
FIG. 14 is a schematic of the components of the body and a leg of the robot according to various embodiments.

Referring to FIG. 14, a schematic of the control system of the robot 100 of the present teachings is shown. The control unit 116 can include a main processor 140, such as, for example, the ATMEL MEGA88 processor (commercially available from Atmel Corporation of San Jose, Calif.). Sensor processing, motor control, command response, telemetry storage/transmittal, as well as other functions, can be processed by way of the main processor 140 of the robot 100. A command/data acquisition station, such as, for example, a host computer 190 located at a remote location, allows the operator to send commands and receive and display robot telemetry data obtained from the robot 100 via a wireless link. The host computer 190 can be provided with sufficient memory to store telemetry data, as well as other data for use at a later time.

The control unit 116 of the robot 100 can be programmed with a first code and each of the SCMs (e.g., the first SCM 150 of the first pivot joint 50 and the second SCM 160 of the second pivot joint 60) can be programmed with a second code. The first code can enable the control unit 116 to at least (i) send gait positions to each of the SCMs 150, 160, (ii) send gripper actuator commands to SCM 160, (iii) receive commands from the host computer 190 to actuate robot movement, and (iv) send robot status information to the host computer 190. The first SCM 150 of the first pivot joint 50 includes a first processor 152. The second SCM 160 of the second pivot joint 60 includes a second processor 162. The second SCM 160 can also be arranged to send control signals to a gripper servo 170 for controlling the gripper assembly 52. Each of the SCMs 150, 160 can implement proportional-integral-derivative (PID) control of the servo motors 64, 74. Implementation of PID control enables under-damped and relatively fast servo motor response during actuation. Furthermore, as discussed above, the internal potentiometers 156, 166 of the servo motors 64, 74 can provide the servo motors of the leg with status information that can be transmitted to the host computer 190. Additionally, each of the potentiometer arms 96 of the first pivot joints 50, 60 (shown in FIGS. 8 and 12) can provide information to the host computer 190 corresponding to the actual position of each of the legs. Moreover, by measuring the difference or changes between the internal potentiometers 156, 166 and the potentiometer arms 96 information corresponding to the torque applied to each of the legs can determined.

Control of a sample requested leg movement will now be described with reference to both FIGS. 14 and 15. During such sample operation, the remotely located host computer 190 can send a first command to the robot 100 directing it to pivot the bicep 46 of the leg in a counter-clockwise direction around the first pivot joint 50. Concurrently, the host computer 190 can send a second command to the robot 100 directing it pivot the forearm 48 of the leg in a clockwise direction around the second pivot joint 60, and a third command to directing it to open the gripper assembly 52. Each of these commands can be received by the communication system 130 located within the body 20 of the robot 100. The communication system 130 then forwards these commands to the control unit 116 via an UART interface 132.

The main processor 140 of the control unit 116 then distinguishes each of these three commands. The first command is then forwarded to the first SCM 150 of the first pivot joint 50 by way of a wire interface 180, while the second and third commands are forwarded to the second SCM 160 of the second pivot joint 60 by a further wire interface 180.

The first SCM 150 processes the first command with the first processor 152. The first processor 152 then sends the first command to a first motor controller 154, which activates the first servo motor 64 thereby pivoting the bicep 46 in a counter-clockwise direction at a commanded speed and distance.

The second SCM 160 processes the second command with the second processor 162 and also determines whether the second command is providing instructions either to the second servo motor 74 of the forearm 48 or to the micro servo 170 of the gripper assembly 52. Since the command is directed to the second servo motor 74 of the forearm 48, the second processor 162 sends the second command to a second motor controller 164 to activate the second servo motor 74 to move the forearm 48 in a clockwise direction at a commanded speed and distance.

The second SCM 160 also processes the third command with the second processor 162 and again determines whether the third command is providing instructions to the second servo motor 74 of the forearm 48 or to the micro servo 170 of the gripper assembly 52. Since the command is directed to the micro servo 170 of the gripper assembly 52, the second processor 162 then sends the third command to the micro servo 170 to open the gripper assembly 52.

Additional commands can be sent to the robot 100 and processed in a like manner to achieve coordinated movement of the legs and, in turn, efficient movement of the robot 100.

Figure 15:
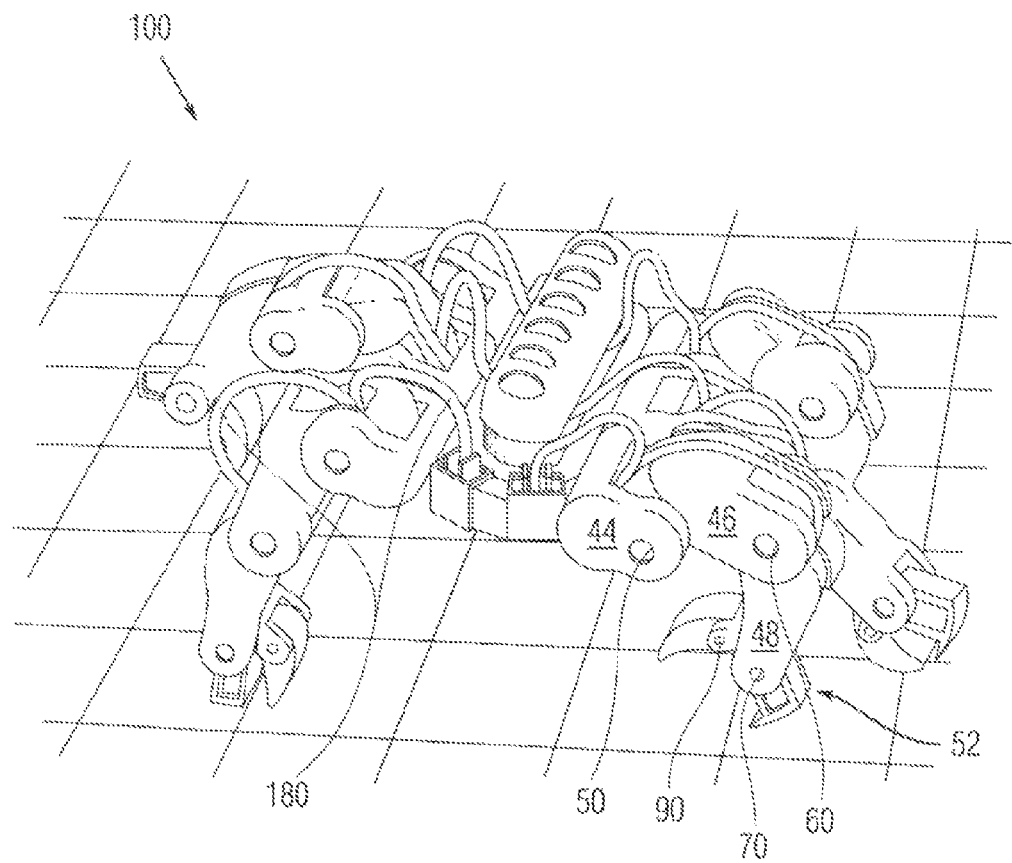
FIG. 15 is a perspective view of the robot during operation on a wire grid according to various embodiments.

Referring to FIG. 15, the robot 100 of the present teachings is shown in the process of employing a statically stable tripod gait. Characteristics of the tripod gait include a three-point contact with a surface at all times. To develop such a gait for use by the robot 100 of the present teachings, each of the pertinent positions along a path is recorded and entered into a gait table. An algorithm running on the main processor 140 of the robot 100 can parse the gait table and depending on the displacement of a particular joint, performs various interpolations (for larger position displacements, more interpolations can be calculated). After the position interpolations are calculated, they are stored into a new gait table that can be used to command robot motion using the host computer 190, as discussed above.

Figure 16:
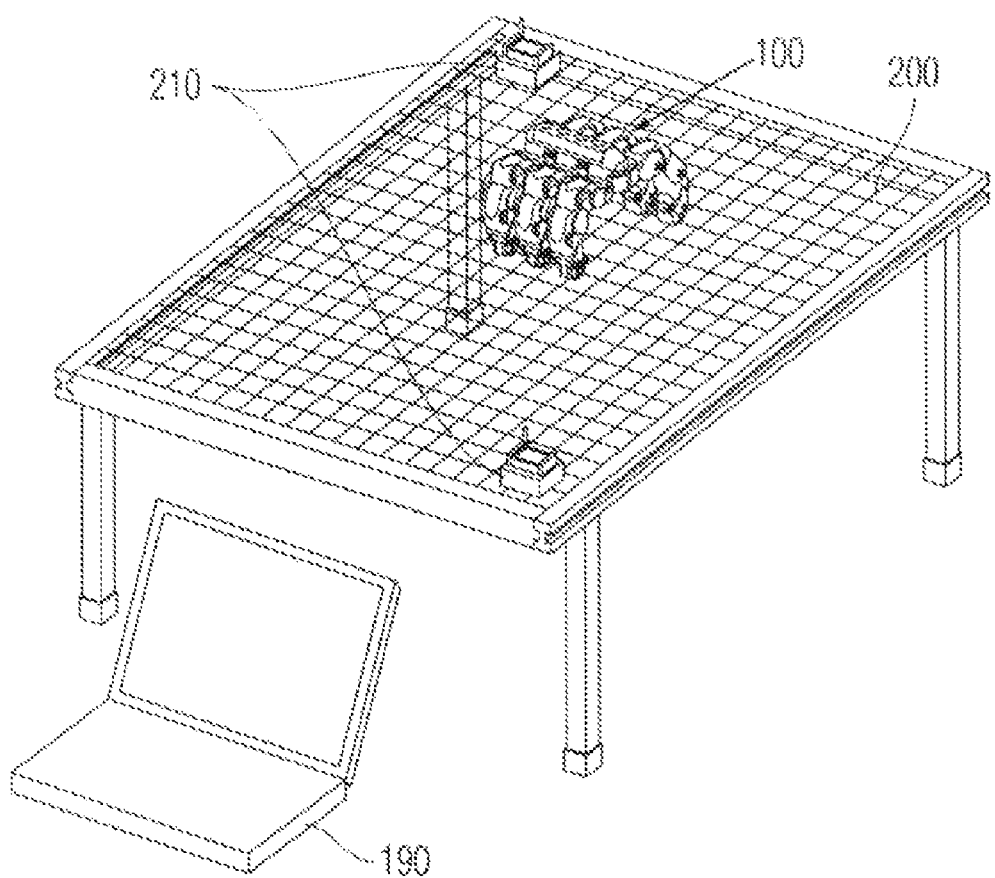
FIG. 16 shows an experimental setup for the robot used during a test flight to simulate a zero-gravity environment.

Referring to FIG. 16, a testing arrangement for the robot 100 of the present teachings is shown. The testing arrangement encompassed a space analogue (i.e. zero-gravity) environment produced by a reduced gravity aircraft flight. The results of the test flight showed that the robot 100 of the present teachings can successfully traverse a wire mesh 200 in zero-gravity conditions. During the test, two high-resolution video cameras (not shown) filmed several attempts of the robot 100 to traverse the wire mesh 200 during the zero-gravity condition. The rate of traversal of the robot 100 was recorded as one body length (equivalent to three steps) per 18 seconds. In the testing environment, the robot 100 was exposed to 20 seconds of weightlessness. During this time, an inertial measurement unit (IMU) 210 passively monitored the conditions on the wire mesh 200 and sent data to the host computer 190, which in this example was a laptop computer 190, for storage. The flight conditions did not cause any recordable external disturbances in the testing environment, including the wire mesh 200.

During a test flight, two robots 100 each having identical mechanical characteristics was run using different gait algorithms. The control unit 116 of the robot 100 included an interface connected to a processor that recorded data from the IMUs 210. Due to time constraints, three external switches were mounted on the outside area of the chassis of the robots 100 and were interfaced to the main controller 140 of the robot 100. These three switches operated to direct the robot 100 with commands to achieve movement during the test.

The test environment was subjected to the external effects of the plane. The plane, a modified Boeing 747, flew in a parabolic flight path to simulate zero-gravity (0 G) conditions. During each parabolic flight path, 20 seconds of 0 G conditions were followed by 30 seconds of 1.8 G conditions. During the 1.8 G conditions, the robot 100 was positioned on the mesh 200 and was enabled/turned on. It was recorded that the robot 100 sustained walking capabilities during the transition from 0 G to 1.8 G. The robot was also able to sustain walking capabilities during the 1.8 G period.

On the ground, much time was dedicated to constructing a gait table that would allow the robot 100 to crawl on the mesh 200 during zero-gravity conditions. This required a meticulous study of how the robot 100 would react while in flight. A gait table was refined to handle a gait that would allow the robot 100 to grip a rung with one leg and extend to another rung with a different leg from various positions on the mesh 200. External perturbations of the mesh 200, including low and high-frequency vibrations of both small and large magnitudes, were also applied to the robot 100 to test the functionality of the gait. Smoothing algorithms allowed an interpolation between the key positions of the gait to be entered into the table. This resulted in a smooth leg motion that would otherwise be unobtainable with the PID controllers. The robot 100 was programmed with gaits that allowed it to traverse the mesh 200 in all orientations (i.e. vertically, upside down, and right side up). The span of each gripper assembly when opened allowed for rough placement of the leg over a rung of the mesh 200. The gripper assembly was arranged such that it could actuate and successfully catch a rung while being off by as much as about 0.39 in (1 cm) in any direction.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A robot comprising:
a body having a longitudinal axis and including a control unit and a power source; and
a first leg pair including a first leg and a second leg, each leg of the first leg pair being pivotally attached to the body and constrained to pivot in a first leg pair plane that is substantially perpendicular to the longitudinal axis of the body.

2. The robot of claim 1, further comprising a second leg pair including a first leg and a second leg, each leg of the second leg pair being pivotally attached to the body and constrained to pivot in a second leg pair plane that is substantially perpendicular to the longitudinal axis of the body and substantially parallel to the first leg pair plane.

3. The robot of claim 2, further comprising a third leg pair including a first leg and a second leg, each leg of the third leg pair being pivotally attached to the body and constrained to pivot in a third leg pair plane that is substantially perpendicular to the longitudinal axis of the body and substantially parallel to the first and second leg pair planes.

4. The robot of claim 3, wherein at least three of the legs of the robot are arranged to contact a surface at all times during operation of the robot.

5. The robot of claim 1, wherein at least one of the legs is a modular interchangeable leg.

6. The robot of claim 1, wherein each of the legs includes at least one controller module arranged to communicate with the control unit of the body.

7. A robot comprising:
a body including a power source and a control unit; and
at least one leg pivotally attached to the body and including a first pivot joint, the first pivot joint including a first servo motor, a first controller module, and a first spring-loaded compliance mechanism;
wherein the control unit is arranged to communicate with the first controller module to control a first pivotal movement of the leg.

8. The robot of claim 7, wherein the at least one leg includes a second pivot joint including a second servo motor, a second controller module, and a second spring-loaded compliance mechanism, the control unit being arranged to communicate with the second controller module to control a second pivotal movement of the leg.

9. The robot of claim 8, wherein the at least one leg further includes a gripper assembly.

10. The robot of claim 9, wherein the gripper assembly includes a gripper pivot joint including a third spring-loaded compliance mechanism.

11. The robot of claim 7, wherein the body further includes a communication system including (i) a wireless area network capable of receiving high-level commands from a host computer, and (ii) a wire interface arranged to send commands from the control unit to at least one controller module in a leg.

12. The robot of claim 9, wherein the control unit is programmable to perform at least one of the following: (i) transmit a plurality of gait positions to each of the first controller module and the second controller module, (ii) transmit gripper actuator commands to the gripper assembly, (iii) receive commands from a host computer located a distance away from the robot, and (iv) transmit status information to the host computer.

13. The robot of claim 7, wherein the first controller module includes a motor controller and a processor.

14. The robot of claim 7, wherein the first pivot joint includes at least one potentiometer capable of taking measurement relating to a net torque exerted by the spring compliance mechanism.

15. A robot system comprising:
a body comprising:
a communication system capable of receiving high level commands from a host computer;
a control unit; and
a power source;
at least one leg pivotally attached to the body, each leg comprising:
a first pivot joint including a first controller module, a first servo motor, and a first spring-loaded compliance mechanism;

a second pivot joint including a second controller module, a second servo motor, and a second spring-loaded compliance mechanism; and a foot assembly;

wherein each of the first controller module and the second controller module is capable of directly communicating with the control unit.

16. The robot system of claim 15, wherein the second controller module is capable of transmitting control signals to the foot assembly.

17. The robot system of claim 15, wherein the foot assembly includes a micro-servo.

18. The robot system of claim 15, wherein the communication system comprises a wireless area network.

19. The robot system of claim 15, wherein the first controller module and the second controller module are in communication with the control unit by way of a wire interface.

20. The robot system of claim 15, wherein the control unit is programmable to perform at least one of the following: (i) transmit a plurality of gait positions to each of the first controller module and the second controller module, (ii) transmit commands to foot assembly, (iii) receive commands from a host computer located a distance away from the robot, and (iv) transmit status information to the host computer.

* * * * *